United States Patent [19]
Capretta et al.

[11] Patent Number: 5,549,307
[45] Date of Patent: Aug. 27, 1996

[54] MULTI-LAYER METAL GASKET WITH DOUBLE BEADED COMBUSTION SEAL

[75] Inventors: Richard Capretta, Wadsworth; Colin Chen, Barrington; Daniel E. Czernik, Hinsdale; Robert H. Morris, Jr., Downers Grove; Richard J. Pavel, Woodridge, all of Ill.

[73] Assignee: Fel-Pro Incorporated, Skokie, Ill.

[21] Appl. No.: 324,348

[22] Filed: Oct. 17, 1994

[51] Int. Cl.⁶ ........................................ F16J 15/08
[52] U.S. Cl. .................. 277/235 B; 277/213; 277/236
[58] Field of Search .......................... 277/235 B, 180, 277/207 R, 213, 235 R, 236

[56] References Cited

U.S. PATENT DOCUMENTS

| | | | |
|---|---|---|---|
| 4,759,585 | 7/1988 | Udagawa | 277/235 B |
| 4,799,695 | 1/1989 | Yoshino | 277/235 B |
| 4,813,691 | 3/1989 | Schoenborn | 277/235 B |
| 4,867,462 | 9/1989 | Udagawa | 277/235 B |
| 4,938,488 | 7/1990 | Udagawa et al. | 277/235 B |
| 4,971,338 | 11/1990 | Udagawa | 277/235 B |

FOREIGN PATENT DOCUMENTS

| | | | |
|---|---|---|---|
| 2234001 | 1/1974 | Germany | 277/235 B |
| 3310497 | 9/1984 | Germany | 277/235 B |
| 6129541 | 5/1994 | Japan | 277/235 B |

*Primary Examiner*—Daniel G. DePumpo
*Attorney, Agent, or Firm*—Laff, Whitesel, Conte & Saret, Ltd.

[57] ABSTRACT

A multi-layer metal gasket for an internal combustion engine having a first plate having a major surface, a return defining a combustion opening and a flange, a second plate defining an annular opening adjacent the return and lying between the flange and the major surface of the first plate, a first annular embossment in the major surface of the first metal plate and having a projection extending towards the flange and lying within the vertical projection of the flange, and a second annular embossment in the second plate, the second embossment defining a second projection and a recess, the second projection extending towards the flange, with the recess nestingly receiving the projection of the first embossment, and the confronting surfaces of the first projection and the recess being substantially coincident throughout, with the first and second embossments being entirely disposed between the return and the flange and lying within the vertical projection of the flange.

4 Claims, 2 Drawing Sheets

MULTI-LAYER METAL GASKET WITH DOUBLE BEADED COMBUSTION SEAL

BACKGROUND OF THE INVENTION

A variety of multi-layer metal gaskets have been proposed for use as head gaskets. Such gaskets employ elastomeric coatings, sealing beads and a myriad of techniques to seek to generate effective seals around combustion openings and other openings requiring sealing.

In certain classes of such laminated gaskets, folded over flanges are used at combustion openings and embossments or beads are disposed under the flanges to assist in providing a seal threat. Known gaskets of this type tend to concentrate the applied loads in one annular zone, such as in the area of the folded over flange sometimes referred to as the "nose". This can result in extrusion of the microsealing layers, brinelling of a surface to be sealed thereby, and ultimately loss of the seal. Since there is no back-up to the seal at the nose area, the gasket can then fail.

It would be desirable to distribute the applied load in the zone of the flange so that there is an effective back-up seal, so that long term recovery will be provided in the flange area, and so that the tendency to brinell and the tendency of any rubber coatings to extrude could be minimized.

SUMMARY OF THE PRESENT INVENTION

In accordance with the present invention, an improved multi-layer metal head gasket for an internal combustion engine is provided. The gasket comprises a first metal plate defining a major surface, a return defining a combustion opening, and a flange, the flange terminating in a free edge, and a second metal plate defining an annular opening adjacent the return and lying between the flange and the major surface of the first plate. A first annular embossment is formed in the major surface of the first metal plate and has a projection extending towards the flange and lying within the vertical projection of the flange. A second annular embossment is provided in the second plate, the second embossment defining a second projection and a recess. The second projection extends towards the flange. The recess nestingly receives the projection of the first embossment, the confronting surfaces of the first projection and the recess are substantially coincident throughout, and the first and second embossments are entirely disposed between the return and the free edge of the flange and lie within the vertical projection of the flange.

Preferably the gasket comprises a third plate defining an opening of a size greater than the dimension of the free edge of the flange, and the third plate is disposed between the first and second metal plates. The third plate desirably defines a sealing embossment remote from the free edge of the flange, which sealing embossment is disposed between the first and second plates. In a most preferred form the aggregate thickness of the metal in the zone of the flange is greater than the aggregate thickness of the metal in the zone of the second embossment. Further objects, features and advantages of the present invention will become apparent from the following drawings and description.

DETAILED DESCRIPTION OF THE PREFERRED EMBODIMENT

Figure 1:
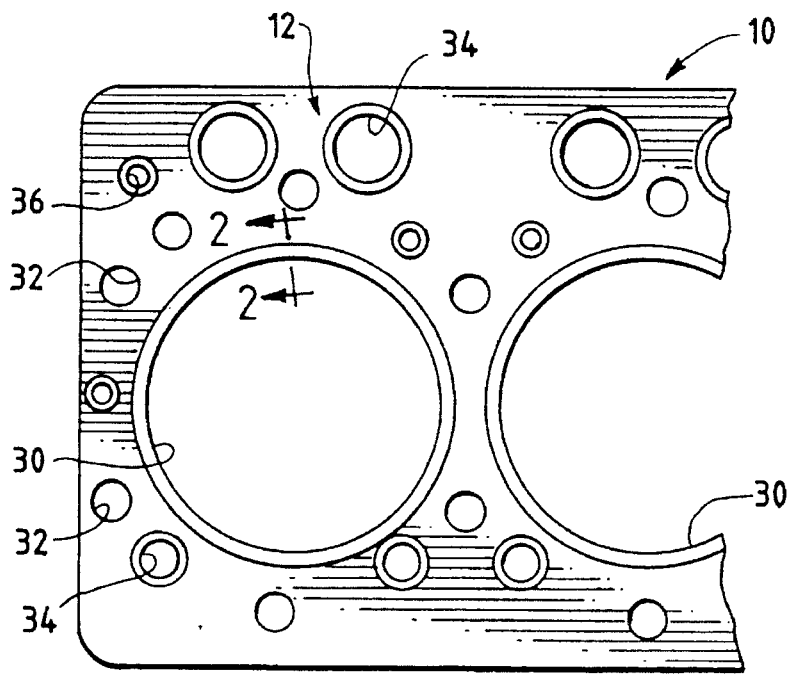
FIG. 1 is a plan view of a gasket of the present invention.
Figure 2:
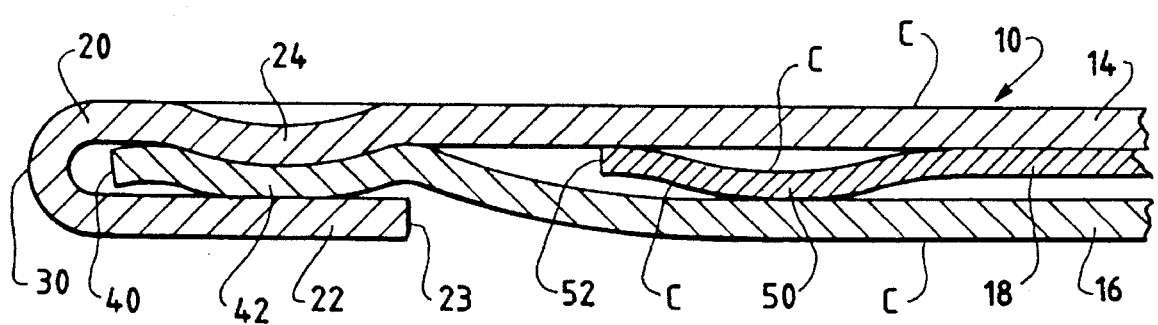
FIG. 2 is a cross-sectional view taken substantially along line 2—2 of FIG. 1.

Referring now to the drawings, and in particular to FIGS. 1 and 2, a typical head gasket 10 embodying the present invention comprises a main body 12 comprised of a plurality of metal plates or layers, and a series of clear through openings. The openings include combustion openings 30, bolt holes 32, water holes 34 and oil holes 36, all for communicating with complementary openings in the head and block with which the particular head gasket is designed to be used.

The metal layers comprising the main body 12 of the gasket include, in the embodiment shown, a first outer main plate 14, preferably of Type 304 stainless steel, a second outer main plate 16, preferably of a low carbon steel, and at least one inner plate 18, preferably of Type 301 stainless steel.

As is seen in FIG. 2, the first outer main plate 14 terminates inwardly in a fold or return 20 which defines a combustion opening 30, and an annular flange 22. The return integrally connects the flange and main surface of the plate. The flange terminates in a free edge 23. The main or major surface of the plate 14 lying within the vertical projection of the annular flange 22 defines an annular depending embossment or bead 24, the projection of which extends inwardly towards the flange 22.

The second outer main plate 16 terminates in an annular inner opening 40 adjacent to the return 20. Its annular dimension is slightly larger than that of the combustion opening 30 as may readily be seen in FIG. 2. The main surface of plate 16 also defines an annular embossment or bead 42 which lies within the vertical projection of the annular flange 22. Bead 42 defines a projection and a recess and is complementary to bead 24. The projection of bead 24 fully rests within the recess of bead 42 through the entire radial extent thereof. As may be seen in FIG. 2, the very inner edge 40 of plate 16 is slightly spaced from the inner surface of plate 14, thus providing a semi-embossment inwardly of the termination of embossments 24, 42.

At the outer edges of beads 24, 42, the portions most remote from the combustion opening, the plates 14 and 16 diverge to receive and accommodate the inner plate 18. Inner plate 18 also defines an embossment or bead 50 adjacent the inner edge 52 of plate 18. Inner edge 52 lies outside of the vertical projection of flange 22.

The thicknesses of the plates 14, 16, 18 are proportioned so that the total thickness of the metal in the zone of the flange 22 is greater than that in the zone of bead 50. In the illustrated embodiment that is accomplished by providing an inner plate 18 of a thickness less than that of each of the outer plates 14, 16. Specifically, the plates in this embodiment may be, respectively, 0.012 inch for plate 14, 0.012 inch for plate 16, and 0.009 inch for plate 18. The thicknesses of plates 14 and 16 may be the same or different, according to the overall desired characteristics for the gasket 10. Because the total thickness of the gasket body 12 in the zone of bead 50 is less than that in the flange zone, the bead 50 will not flatten in use and will remain resilient to provide a living, working seal at its location and against both the head flange and block flange.

Gaskets of the present invention may be provided within elastomeric microsealing layers C. Typically the outer surfaces of such gaskets will be so coated, as will be at least one of each pair of facing inner surfaces. These coatings may be from about several ten thousandths to about several thousandths of an inch in thickness and may be a variety of elastomeric materials such as nitrile rubber, Viton, among others. Thus, coatings C may be provided on the indicated surfaces of gasket 10.

Figure 3:
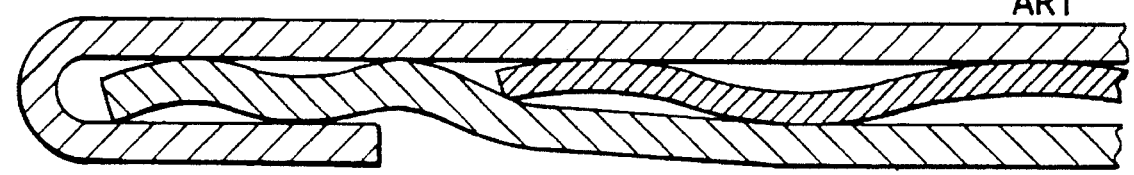
FIG. 3 is a cross-sectional view of a prior art gasket taken in a location like that of FIG. 2.

Returning now to the flange zone, the bead arrangement specified produces a load distribution which is a substantial improvement over beads of the prior art type shown in FIG. 3. In FIG. 3, three plates similar to the inner, outer and middle plates 14, 16, 18 are present. The thicknesses and materials of the plates in FIG. 3 are generally the same as those in FIG. 2, and the dimensions and proportions are very comparable. The principal difference is that the outer plate 14 defines a bead which fully nests within recess of the bead 42 of plate 16 in accordance with the present invention, whereas there is no such nesting bead arrangement in the prior art gasket of FIG. 3.

Figure 4:
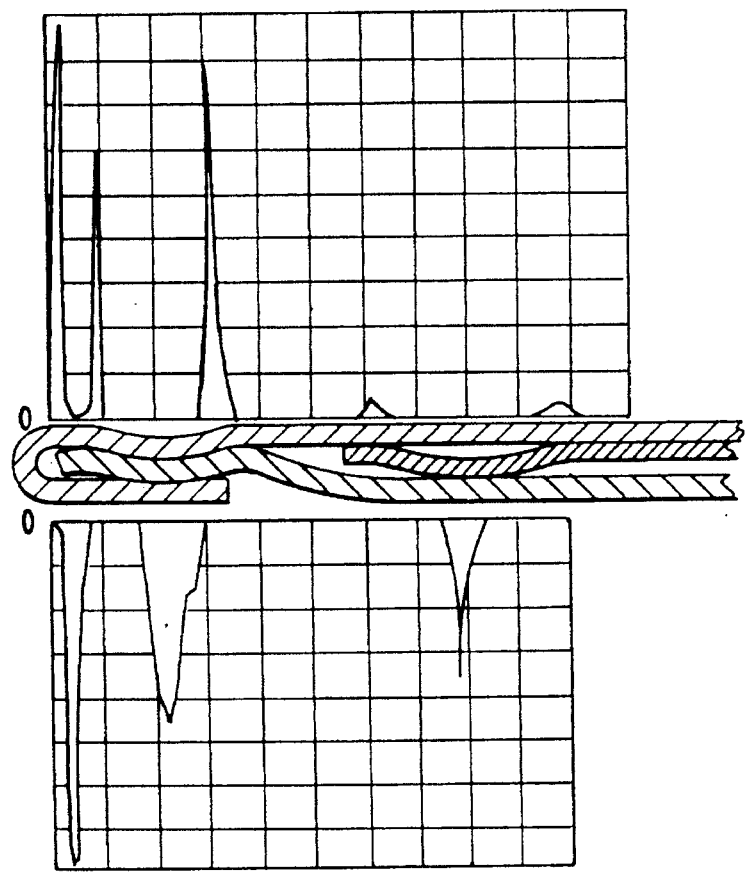
FIG. 4 is a finite element analysis (FEA) simulation showing a typical load distribution for the gasket of FIG. 2.
Figure 5:
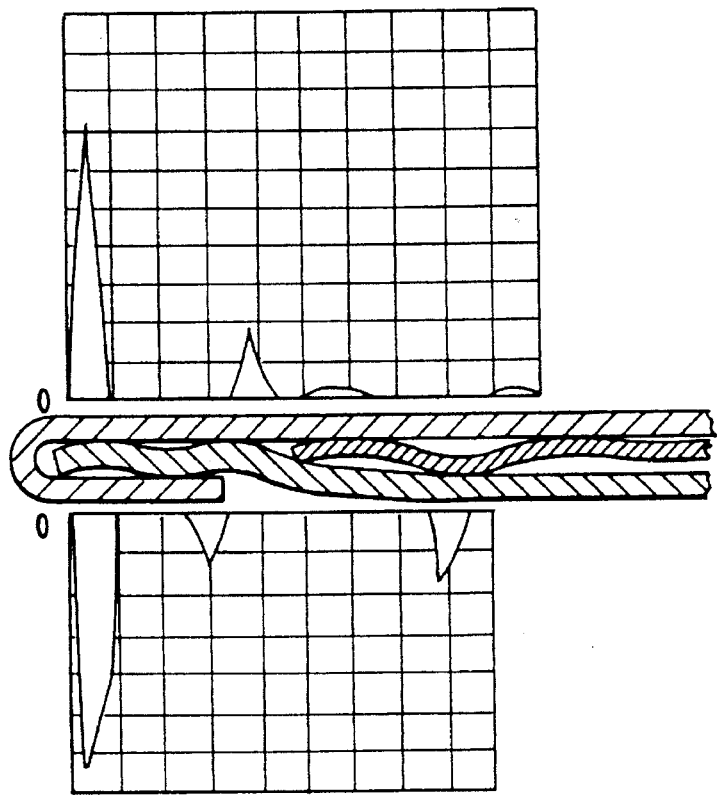
FIG. 5 is a finite element analysis (FEA) simulation showing a typical load distribution for the prior art gasket of FIG. 3.

As may be seen from FIGS. 4 and 5 (which superimpose simulated finite element analysis load distribution graphs with the cross sections of the gaskets of FIGS. 2 and 3, respectively), the majority of the load at the zone of the combustion opening in the gasket of FIG. 3 is concentrated at the front edge or "nose" area of the flange. There is very little loading (or sealing) radially outwardly therefrom in the flange zone. The concentration of the loading in this "nose" area will tend to extrude any rubber coatings and may even brinell the mating engine surface (which may be aluminum) and result in unloading of the gasket. Because there is no effective back-up in this type of design, the gasket may eventually fail to seal.

To the contrary, the loading in the flange zone in the gasket of the present invention is well distributed from the inner to outer portions of the flange as may be seen from the finite element analysis simulation of FIG. 4. Thus, there is substantial and effective sealing in at least two annular zones at each of the gasket faces in the flange zone. As such the load on the "nose" will be more reasonably managed and there will be an effective or back-up sealing point behind it. This will minimize rubber extrusion and brinelling, will establish a back-up seal, and will perform better. Finally, long-term recovery in the flange area will be provided.

Further, in the zone of inner plate bead 50, in the prior art finite element analysis simulation of FIG. 5, it is apparent that there is essentially no sealing at the surface of the upper outer plate, and the sealing of the surface of the lower outer plate is very modest. To the contrary, in the gasket of the present invention, sealing is improved at the upper plate surface, and dramatically improved at the lower plate surface in the zone of the inner plate bead 50.

From the foregoing it will be apparent to those skilled in the art that modifications may be made without departing from the spirit and scope of the invention. As such it is intended that the invention is to be limited only as may be made necessary by the claims appended hereto.

What is claimed is:

1. A multi-layer metal gasket for an internal combustion engine comprising a first metal plate defining a major surface, a return defining a combustion opening, and a flange, said flange terminating in a free edge, a second metal plate defining an annular opening adjacent said return and lying between said flange and said major surface of said first plate, a first annular embossment in the major surface of said first metal plate and having a projection extending towards said flange and lying within the vertical projection of said flange, a second annular embossment in said second plate, said second embossment defining a second projection and a recess, said second projection extending towards said flange, and wherein said recess nestingly receives the projection of said first embossment, the confronting surfaces of said first projection and said recess being substantially coincident throughout, said first and second embossments being entirely disposed between said return and said free edge of said flange and lying within the vertical projection of said flange, and wherein said flange is flat and without an embossment and is Spaced away from said second metal plate at locations which are radially inwardly and radially outwardly of said embossments.

2. The multi-layer metal gasket of claim 1, and wherein said gasket comprises a third plate defining an opening of a size greater than the dimension of the free edge of said flange, said third plate being disposed between said first and second metal plates.

3. The multi-layer metal gasket of claim 1, and wherein said third plate defines a sealing embossment remote from the free edge of said flange, said sealing embossment being disposed between said first and second plates.

4. The multi-layer metal gasket of claim 3, and wherein the aggregate thickness of the metal in the zone of said flange is greater than the aggregate thickness of the metal in the zone of said sealing embossment.

* * * * *